US008756528B2

(12) United States Patent
Cristofoli

(10) Patent No.: US 8,756,528 B2
(45) Date of Patent: Jun. 17, 2014

(54) SYSTEM AND METHOD OF CUSTOMIZING VIDEO DISPLAY LAYOUTS HAVING DYNAMIC ICONS

(75) Inventor: Gary Cristofoli, Coconut Creek, FL (US)

(73) Assignee: Ascom (Sweden) AB, Gothenburg (SE)

( * ) Notice: Subject to any disclaimer, the term of this patent is extended or adjusted under 35 U.S.C. 154(b) by 384 days.

(21) Appl. No.: 11/429,233

(22) Filed: May 8, 2006

(65) Prior Publication Data

US 2007/0260986 A1 Nov. 8, 2007

(51) Int. Cl.
*G06F 3/048* (2013.01)

(52) U.S. Cl.
USPC .......................... 715/838; 715/800; 715/815

(58) Field of Classification Search
USPC ......... 715/719–726, 757, 790–780, 800, 801, 715/815, 838
See application file for complete search history.

(56) References Cited

U.S. PATENT DOCUMENTS

| 5,708,826 | A  | * | 1/1998  | Ikeda et al. | 715/840 |
| 5,712,995 | A  | * | 1/1998  | Cohn | 715/792 |
| 5,721,847 | A  | * | 2/1998  | Johnson | 715/786 |
| RE38,401  | E  | * | 1/2004  | Goldberg et al. | 345/720 |
| 6,760,042 | B2 | * | 7/2004  | Zetts | 715/716 |
| 7,230,621 | B2 | * | 6/2007  | Adams, Jr. | 345/427 |
| 7,296,242 | B2 | * | 11/2007 | Agata et al. | 715/793 |
| 7,555,730 | B2 | * | 6/2009  | Atkins | 715/853 |
| 7,689,909 | B1 | * | 3/2010  | Szuszczewicz | 715/792 |
| 2001/0020981 | A1 | * | 9/2001  | Jun et al. | 348/426.1 |
| 2006/0248471 | A1 | * | 11/2006 | Lindsay et al. | 715/800 |

* cited by examiner

*Primary Examiner* — Weilun Lo
*Assistant Examiner* — Truc Chuong
(74) *Attorney, Agent, or Firm* — Birch, Stewart, Kolasch & Birch, LLP

(57) ABSTRACT

A system and method of enabling a user to customize a layout of a video display uses a data file. The data file may be stored within an application. The data file enables the user to specify at least one parameter of a cell of a video display such as, for example, a location, height, width, and display percentage. A layout creating module creates the layout based on the parameter(s) defined by the user. A dynamic icon creating module dynamically creates an icon that represents the layout created by the user. Preferably, the icon depicts the layout of created by the user.

16 Claims, 6 Drawing Sheets

SYSTEM AND METHOD OF CUSTOMIZING VIDEO DISPLAY LAYOUTS HAVING DYNAMIC ICONS

FIELD OF THE INVENTION

The invention relates generally to video display. More particularly, the invention relates to enabling a user to customize a layout of a video display and dynamically creating an icon that depicts the layout.

BACKGROUND OF THE INVENTION

Electronic displays are commonly used to portray data in forms of visual text and/or images. The displays enable users to interpret and/or act upon the data. One advantage to electronic displays is that they enable users to visualize a desired end product. Such systems, however, typically only provide a user with pre-defined layouts. The user may select a pre-defined layout to use as a basis for a desired display. Generally, the pre-defined layouts consist of a grid-like display that is evenly divided into a number of equally sized cells. For example, the pre-defined layouts may include a single, large cell, two (2) cells, four (4) cells, nine (9) cells or sixteen (16) cells. The cells in each layout having more than one (1) cell are the same size. The user may then select a desired input source, image, text or other for each cell in the pre-defined layout.

The user, however, is limited to the pre-defined layouts provided by a particular application. The user is unable to customize the pre-defined layouts by, for example, varying a number and/or size of cells provided in the pre-defined layout. If a user desires a layout different from a pre-defined layout, a user-defined layout must be coded into the application. This does not enable a user to modify the layout. This must be done on an administrator or programmer level.

Typically, creating a new video display on existing systems requires a software engineer to write new code to develop graphical elements of the display and perform testing, a process taking several days. Additionally, icons need to be created using a drawing program and placed into an application. Additional code is needed for the icon to appear in a menu. This time consuming process would need to be repeated whenever an additional video display is requested. Users requiring new displays must obtain and install either a new version of an application or a service pack to add the additional features.

Additionally, some applications generate icons to represent the user-defined layout created. The icons may be given a name designated by the user. These icons, however, are typically generic icons that do not resemble the user-defined layout created. The icons are a standard image or graphic that is assigned to all user-defined layouts. Thus, the only distinguishing characteristic of the icons is the name designated by the user which typically does not meaningfully describe a layout.

These and other drawbacks exist.

SUMMARY OF THE INVENTION

According to one embodiment of the invention, a system and method of enabling a user to customize a layout of a video display is provided. A data file may be stored within an application. The data file enables the user to specify at least one parameter of a cell of a video display. The parameter may be, for example, a location, height, width, and display percentage of the cell within a video display. A layout creating module creates the layout based on the parameter(s) defined by the user.

Each cell may be assigned a particular input source to display. The input source may be identified by, for example, specifying a path within a properties section of the cell or clicking-and-dragging a display of the input source into a cell. Upon specifying an input source, the invention resizes the input source display to fit within the cell. Additionally, the invention maintains an aspect ratio for the input source such that the display of the input source is clear.

In accordance with one embodiment of the invention, a dynamic icon creating module is provided that dynamically creates an icon that represents the layout created by the user. Preferably, the icon depicts the layout of created by the user. The dynamic icon creating module may also locate the icon created within a user-selectable menu for easy selection by a user or other operator. Additionally, the layout created may be assigned a name by the user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
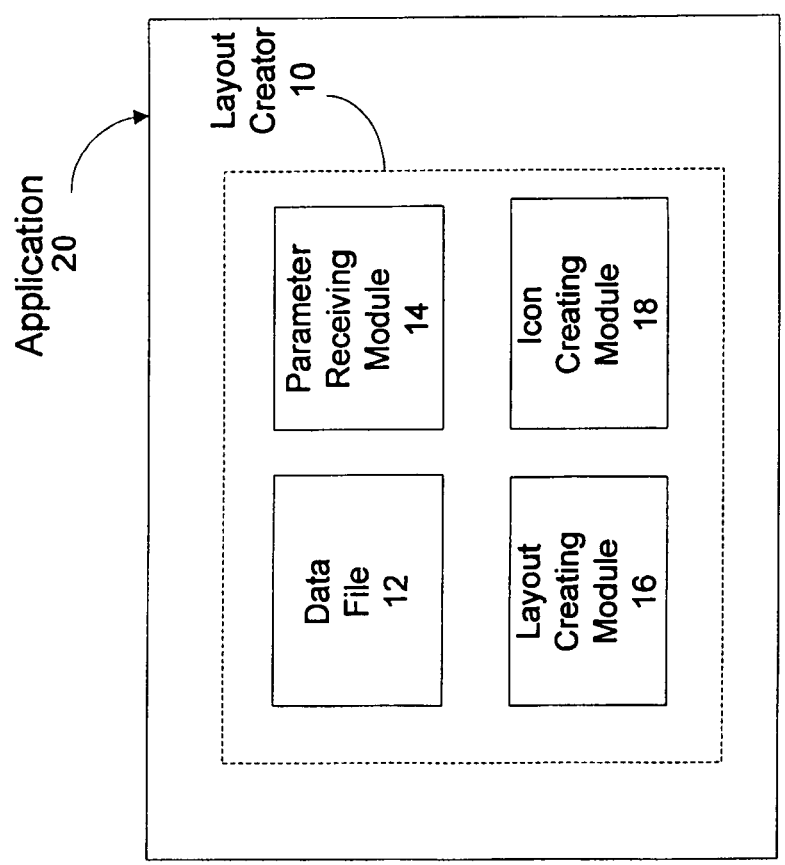
FIG. 1 is an illustration of a system of customizing video display layouts according to one embodiment of the invention.

A system and method are provided that enable video display layouts to be customized. FIG. 1 illustrates a system of customizing video display layouts according to one embodiment of the invention. The system is identified as layout creator 10. According to one embodiment of the invention, the layout creator 10 may be incorporated into an application or other software or hardware. Layout creator 10 may include a data file 12, parameter receiving module 14, layout creating module 16, and icon creating module 18. Preferably, the data file 12 is written using eXtensible Markup Language (XML), however, it is to be understood that other programming languages may also be used. The data file 12 describes a layout of a display to be presented based on specific data identified in the data file 12. The data file 12 may be a set of parameters or attributes for one or more cells within a video display layout.

The parameters or attributes may be, for example, cell location, size such as height and width, and percentage of the display occupied. The cell location may be identified by specifying a home location for the cell. The home location may be, for example, an upper left corner of the cell. The upper left corner is indicated by, for example, specifying an x and y coordinate for the upper left corner. The home position may vary depending on whether the cell is relocated by, for example, a user clicking-and-dragging the cell to a new location.

The size of the cell may be determined using the home location. For example, an upper left corner of the cell is specified by the home location. A width and height of the cell is also specified in the data file 12. The cell may then be generated by creating two (2) cell borders from the home location. One cell border extends from the home location to a height end point and another cell border extends from the home location to a width end point of the cell. Preferably, the cell is rectangular, therefore, the two (2) remaining cell borders may be generated by creating borders that are mirror images of the borders previously created and that extend from the height end point and width end point of the cell.

The parameter receiving module 14 of the layout creator 10 receives the parameter(s) for one or more cells of a video display layout the are specified in the data file 12. The parameter receiving module 14 communicates the parameter(s) to the layout creating module 16. Based on the parameter(s) received, the layout creating module 16 creates a customized video display layout using the parameter(s) received from the parameter receiving module 14. The layout creating module 16 creates a customized video display layout having one or more cells arranged and sized according to the parameter(s) specified in the data file 12. This may include creating a customized video display layout having a plurality of cells. Each cell may be a different size and located in a predetermined desired location. Each cell may also occupy a predetermined percentage of a video display as specified in the data file 12.

The layout creating module 16 may also present the customized video display layout on a display. A user or other operator may specify a source for information to be displayed in each cell of the customized video display layout. For example, each cell may have a properties section associated therewith. The properties section may include a source path field that may be used to enable a user to input a path for a desired source to be displayed within that cell. For example, the source path may be for video imagery input, static images, text or other source. Alternatively, the layout creator 10 may enable users to specify input sources using known input mechanisms such as, for example, clicking-and-dragging display windows presenting the source(s) into the cell(s) desired to display the source selected using a conventional mouse.

According to one embodiment of the invention, the layout creating module 16 may also enable a user to visually create a customized layout. The layout creating module 16 may present a user with, for example, an editor, that enables the user to create a customized video display layout described in further detail below with reference to FIG. 2.

The icon creating module 18 may be used to dynamically create an icon that is representative of the customized video display layout created. According to one embodiment of the invention, the icon creating module 18 dynamically creates an icon associated with the customized video display layout that depicts the customized video display layout created. Additionally, the icon may be created substantially instantaneously after the customized video display layout is created. The icon creating module 18 may also place the icon created in a menu for selection by a user or other operator.

For example, a customized video display layout is created that has two (2) cells of equal size along a left side of the display, one (1) cell located in the middle of the display, and four (4) cells of equal size located along a right side of the display. An icon is dynamically created substantially immediately following the creation of the customized video display layout. An image presented on the icon created and associated with this customized video display layout also includes two (2) cells of equal size along a left side of the icon, one (1) cell located in the middle of the icon, and four (4) cells of equal size located along a right side of the icon.

In this manner, upon viewing the icon, a user or other operator may determine a layout that is created by selecting that particular icon. This distinguishes the icon from other icons representing customized video display layouts. Instead of having all icons for customized video display layouts having the same image or other characteristic, the icons for each customized video display layout are also customized to facilitate recognition of the layout that is created by selecting that icon. Additionally, the icon creating module 18 may enable a user or other operator to assign a name to the customized video display layout created. This may be performed in any known manner.

Figure 2:
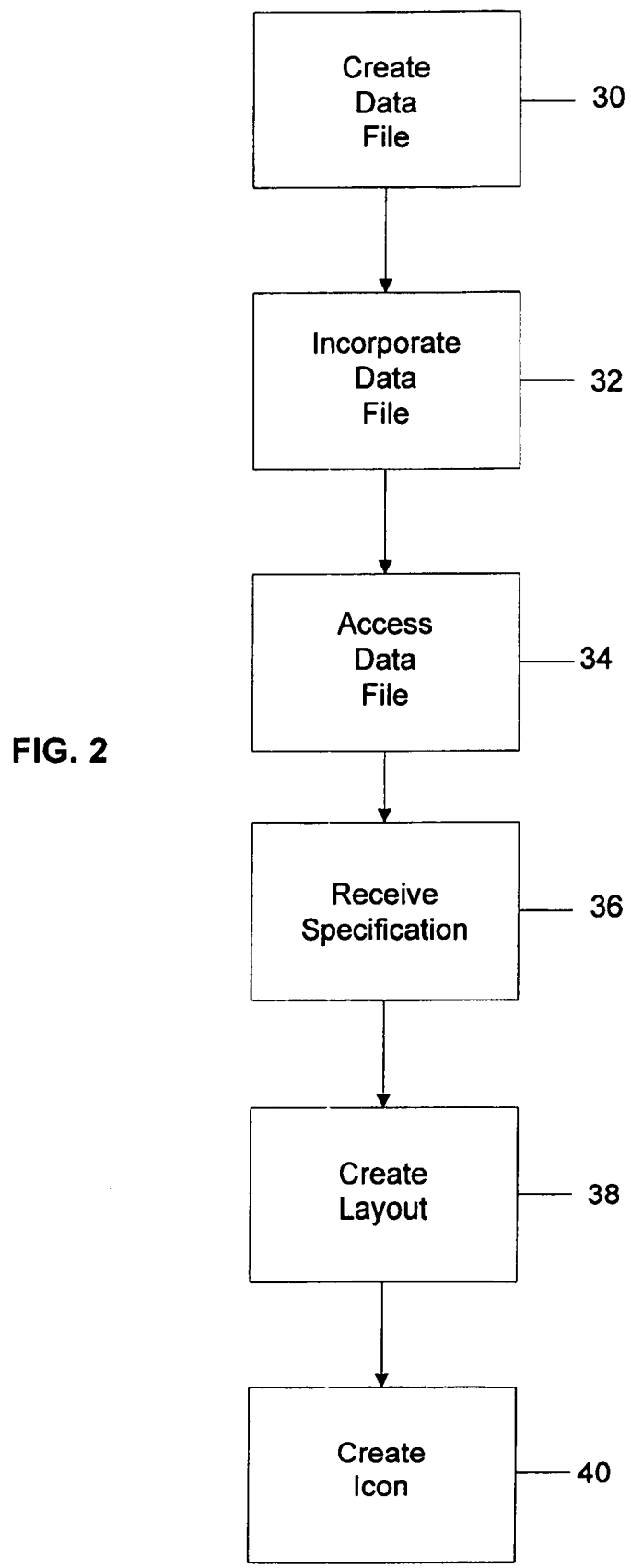
FIG. 2 is an illustration of a method of customizing video display layouts according to one embodiment of the invention.

FIG. 2 illustrates a method of customizing video display layouts according to one embodiment of the invention. To create a customized video display layout according to the invention, a data file is created, step 30. The data file includes one or more parameters that specify at least one of a location, size, and percentage of display space occupied by one or more cells to be created in the customized video display layout. The data file may be incorporated into an application, step 32. By incorporating the data file into an application or other software or hardware, this may facilitate the creation of customized video display layouts offered by the application or other software or hardware by increasing speed and processing.

The application, other software or hardware accesses the configuration, step 34, to obtain parameters identified in the data file. The parameters specify one or more attributes of one or more cells to be created within a customized video display layout. The parameter specifications are received by the application, other software or hardware, step 36. Using the parameter specifications, a customized video display layout may be created, step 38. The customized video display layout includes the cell(s) attribute(s) specified in the data file. Therefore, if the data file specifies a customized video display layout having two (2) cells of equal size along a left side of the display, one (1) cell located in the middle of the display, and four (4) cells of equal size located along a right side of the display, then such a layout is created.

Alternatively, as discussed above, an editor may be used that enables a user to customize a video display layout. The editor may, for example, enable a user to arrange a plurality of cells to create the customized layout. The editor may enable the user to, for example, select one or more predefined cells and position the cell(s) in a desired location in the layout by, for example, clicking-and-dragging a cell using a conventional computer mouse or keyboard, touch-screen, stylus or other input mechanism. The predefined cells may have various heights, widths, shading, configurations, borders or other characteristics. The editor may also enable the user to modify these and other characteristics of each cell using known techniques such as displaying a properties window for a cell that identifies one or more of these characteristics.

An icon representing the customized video display layout created may then be dynamically created, step 40. Preferably, the icon created includes an image representing the customized video display layout created. For example, as stated above, an icon created for a customized video display layout having two (2) cells of equal size along a left side of the display, one (1) cell located in the middle of the display, and four (4) cells of equal size located along a right side of the display also includes two (2) cells of equal size along a left side of the icon, one (1) cell located in the middle of the icon, and four (4) cells of equal size located along a right side of the icon. According to one embodiment of the invention, the icon is dynamically created substantially immediately after the customized video display layout is created.

Figure 3:
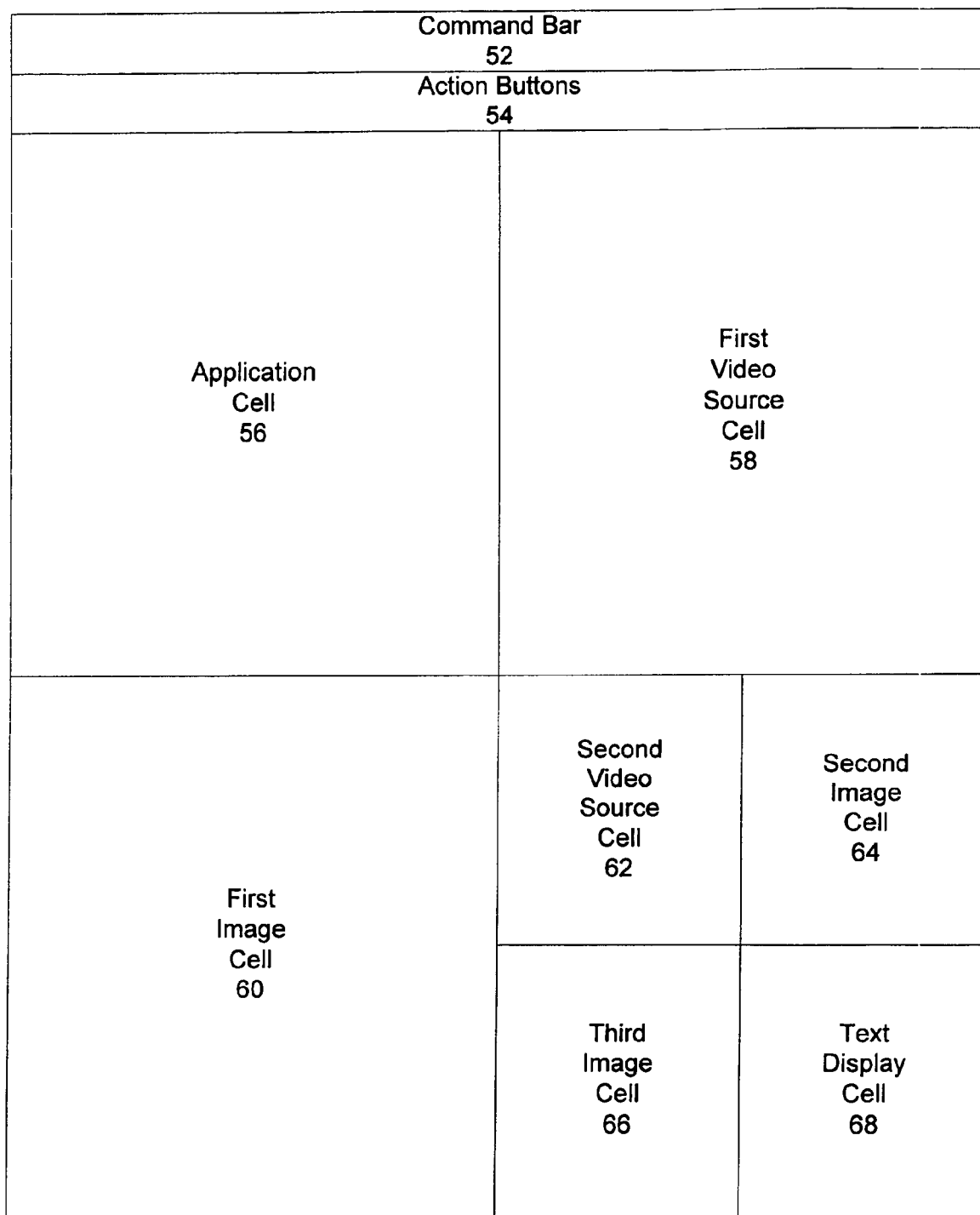
FIG. 3 is an illustration of a customized video display layout according to one embodiment of the invention.
Figure 4:
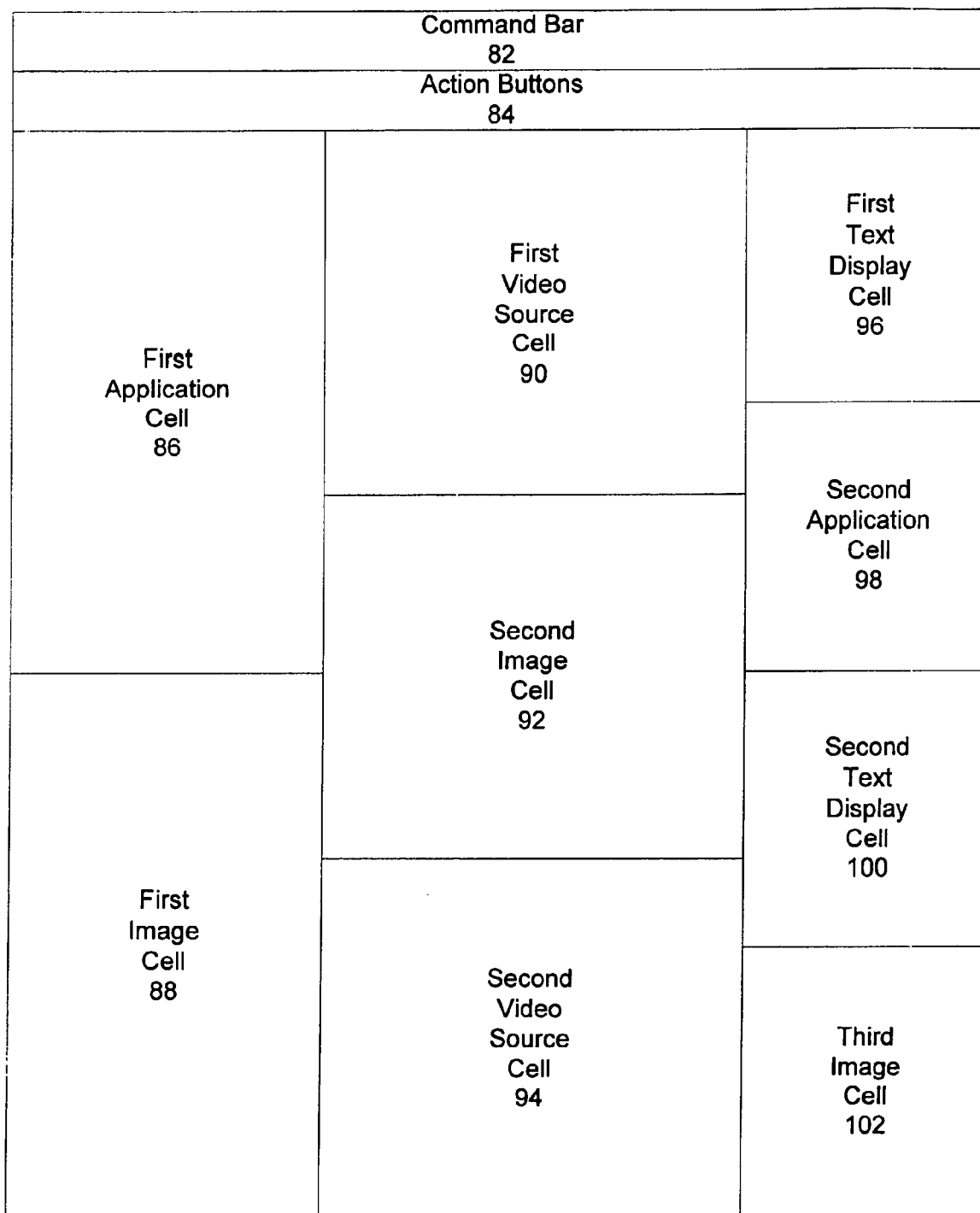
FIG. 4 is an illustration of a customized video display layout according to one embodiment of the invention.

FIGS. 3 and 4 illustrate customized video display layouts 50 and 80, respectively, created according to one embodiment of the invention. The customized video display layouts 50, 80 may include standard command bars 52, 82 and action buttons 54, 84. The command bars 52, 82 may include, for example, file, view, help and other pull-down menus as well as minimize, maximize, and close operations. The action buttons 54, 84 may also include standard actions such as, for example, play, pause, stop, zoom, forward, back, refresh, and other known actions.

FIG. 3 illustrates a customized video display layout 50 having two (2) cells 56, 58 provided along a top and a left side 56, 60 of the display and four (4) cells 62-68 provided in a lower right corner of the display. The top cells 56, 58 display an application and a first video source, respectively. A lower left cell 60 displays a first image. The four (4) cells provided in the lower right corner 62-68, display a second video source, second image, third image, and a text display, respectively. As stated above, a user or other operator of the application may specify a source for each of the cells. The source for a particular cell may be changed by the user or operator by, for example, specifying a different source path in a properties section for the cell or clicking-and-dragging a source to the cell using a conventional mouse as discussed above.

Figures 5, 6:
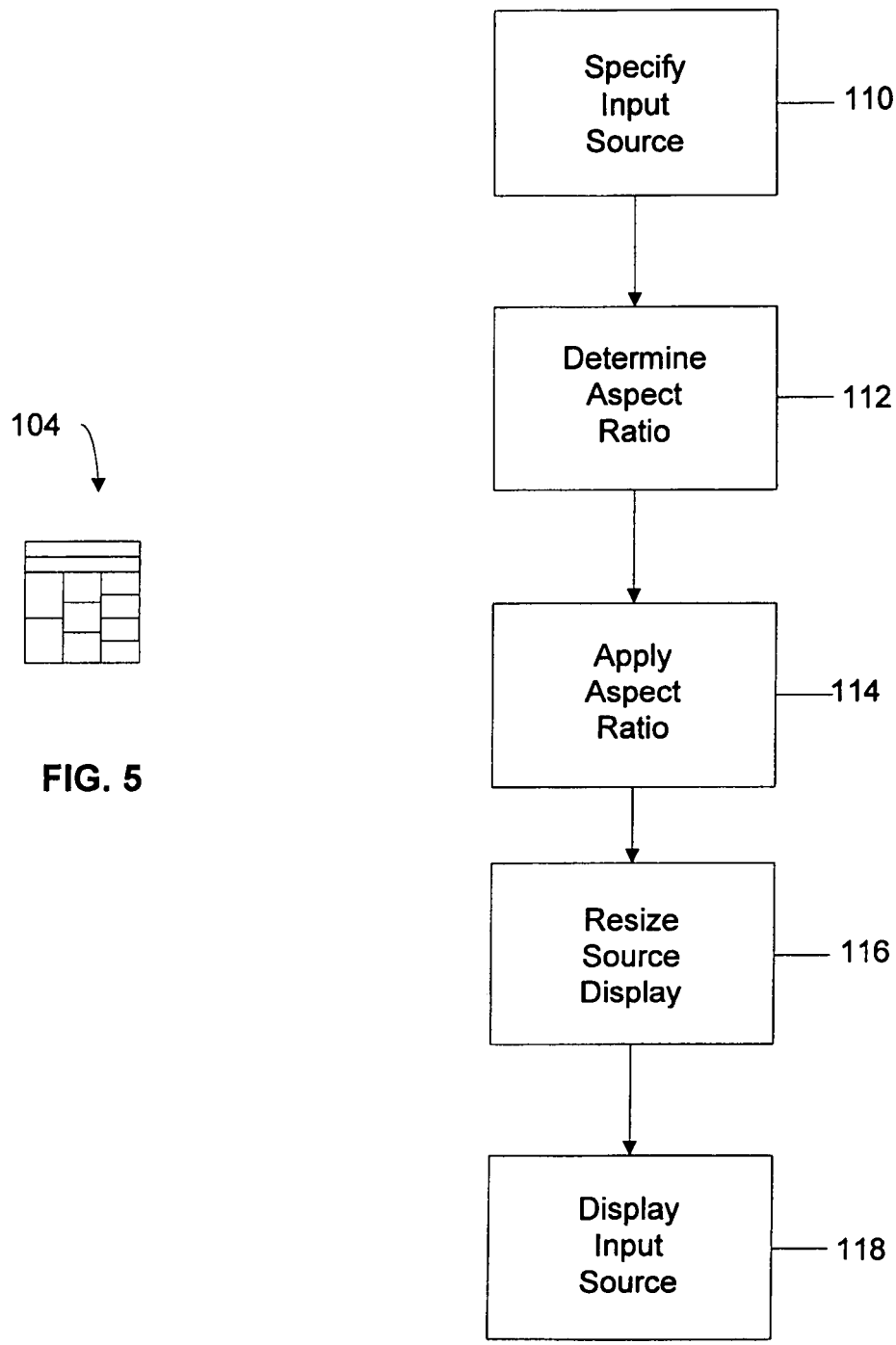
FIG. 5 is an illustration of an icon created according to one embodiment of the invention.
FIG. 6 is an illustration of a method of displaying an input source within a customized video display layout according to one embodiment of the invention.

FIG. 4 illustrates a customized video display layout 80 having two (2) cells 86, 88 provided along a left side of the display, three (3) cells 90, 92, 94 provided in a center portion of the display, and four (4) cells 96-102 along a right side of the display. The left side cells 86, 88 display a first application and a first image, respectively. The center cells 90, 92, 94 display a first video source, a second image, and a second video source, respectively. The four (4) cells along the right side 96-102, display a first text display, a second application, a second text display, and a third image, respectively. The sources for these cells may also be changed as discussed above. FIG. 5 illustrates an icon 104 that may be created for the customized video display layout 80 according to one embodiment of the invention.

FIG. 6 illustrates a method of displaying an input source within a cell of a customized video display layout. According to one embodiment of the invention, an input source for a particular cell is specified, step 110. The input source may be specified, for example, by specifying a source path or clicking-and-dragging an input source display into the cell as discussed above. Upon specifying an input source, an aspect ratio for the input source may be determined, step 112. By determining the aspect ratio for the input source, a display of the input source may be clear and understandable by a user or other operator with little or no distortion as discussed in detail below. The aspect ratio determined is applied to the input source display, step 114. The input source display may then resized to fit within the dimensions of the cell, step 116. The input source is displayed within the limits of the cell size and with an aspect ratio, step 118.

Figure 7:
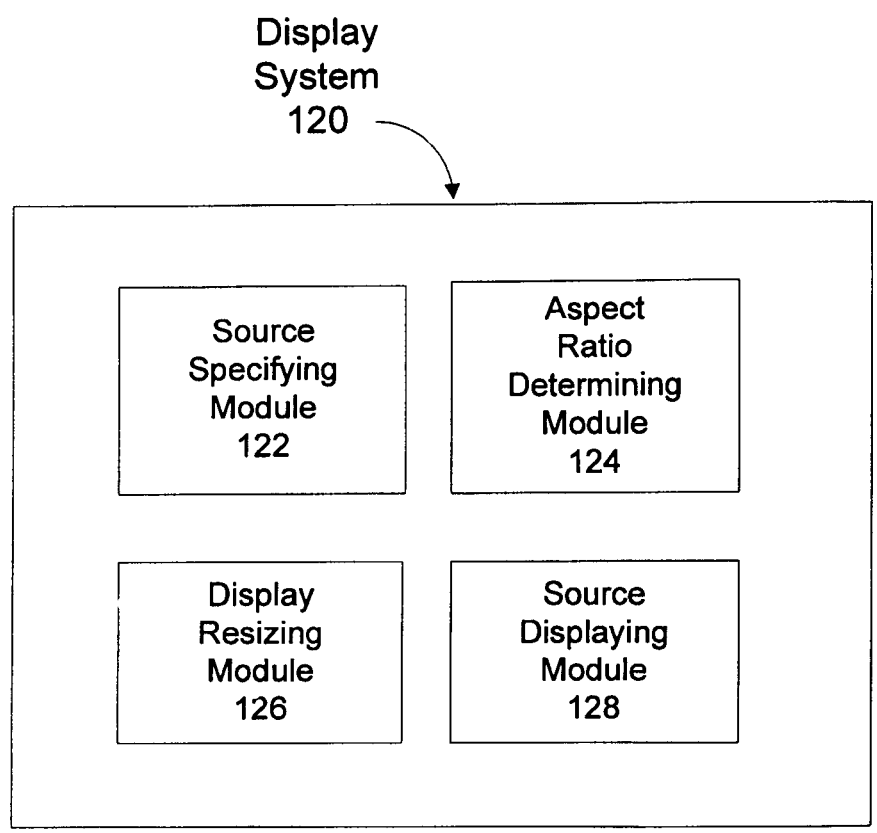
FIG. 7 is an illustration of a system of displaying an input source within a customized video display layout according to one embodiment of the invention.

FIG. 7 illustrates a system 120 of displaying an input source within a cell of a customized video display layout. According to one embodiment of the invention, the system 120 includes source specifying module 122, aspect ratio determining module 124, resizing module 126, and displaying module 128. The input source specifying module 122 enables a user or other operator to specify an input source for a particular cell. The input source may be specified by, for example, specifying a path or clicking-and-dragging as discussed above.

The aspect ratio determining module 124 determines an aspect ratio to be used for displaying the input source within the particular cell. The aspect ratio is based on a height and width of the cell and enables a display to be clear and understandable with little or no distortion as a result of the source being displayed within a display area having a different size than the size of the display area intended. Upon determining the aspect ratio, the aspect determining module 124 may also apply the aspect ratio to the input source display. The display resizing module 126 resizes the input source display to fit within the dimensions of the cell and the source displaying module 118 displays the input source within the cell of the customized video display layout.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method, comprising:
   creating a data file for storing a set of parameters defining a plurality of non-overlapping cells for a user-defined layout of a video display, the parameters comprising a cell size and a cell location;
   accessing the data file;
   creating the user-defined layout based on the stored parameters and a home location for each of the cells; and
   dynamically creating an icon following the creating of the user-defined layout, the icon comprising an exact image of the user-defined layout including all of the cells as arranged in the user-defined layout,
   wherein each cell of the user-defined layout comprises a first cell border that extends from the home location to a height end point, and a second cell border that extends from the home location to a width end point, and wherein the user-defined layout includes at least one cell that comprises at least one of a command bar and an action bar.

2. The method of claim 1, wherein the action bar comprises one or more action buttons operatively configured to control a video source.

3. The method of claim 1, further comprising locating the icon in a user-selectable menu.

4. The method of claim 1, wherein the cell data defines, for each cell, at least one of a cell width, height, home location, and percentage of display occupied.

5. The method of claim 1, further comprising enabling the user to specify at least one source for display within at least one cell.

6. The method of claim 5, wherein the at least one source comprises at least one of a video source, image, and text.

7. The method of claim 1, further comprising specifying a location within the application for the data file.

8. The method of claim 1, further comprising re-sizing at least one cell to accommodate an input source.

9. The method of claim 1, further comprising maintaining an aspect ratio of an input source upon presentation of the input source in at least one cell.

10. An electronic display system, comprising:
a layout creator and a video display;
the layout creator comprising:
a data file for storing a set of parameters defining a plurality of non-overlapping cells for a user-defined layout of a video display, the parameters comprising a cell size and a cell location;
a parameter receiving module to receive the parameters from the data file and a home location for each of the cell;
a layout creating module to create the user-defined layout based on the parameters; and
a dynamic icon creating module to dynamically create an icon following the creation of the user-defined layout, the icon comprising an exact image of the user-defined layout including all of the cells as arranged in the user-defined layout, wherein each cell of the user-defined layout comprises a first cell border that extends from the home location to a height end point, and a second cell border the extends from the home location to a width end point, and wherein the user-defined layout includes at least one cell that comprises at least one of a command bar and an action bar,
wherein the layout creating module presents the user-defined layout on the video display.

11. The system of claim 10, wherein the layout creator includes an icon locating module to locate the icon within a user-selectable menu.

12. The system of claim 10, wherein the cell data defines, for each cell, at least one of a cell width, height, home location, and percentage of display occupied.

13. The system of claim 10, further comprising a source specifying module that enables the user to specify at least one source for display within the at least one cell by the video display.

14. The system of claim 13, wherein the at least one source comprises at least one of a video source, image, and text.

15. The system of claim 10, further comprising a source display re-sizing that resizes an input source display to fit within at least one cell.

16. The system of claim 10, further comprising an aspect ratio maintaining module that maintains an aspect ratio of an input source upon presentation of the input source in at least one cell.

* * * * *